Figures 1, 2:
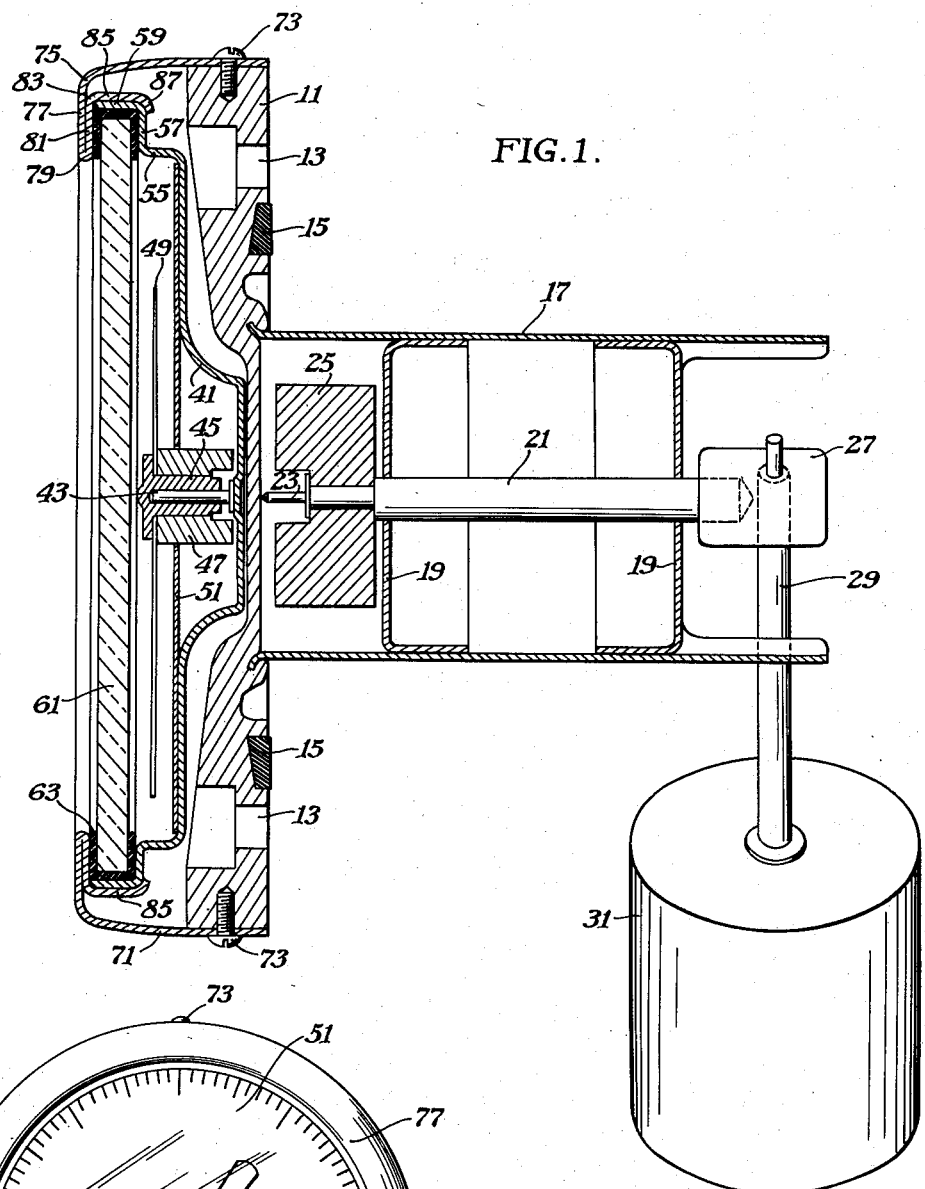

Oct. 6, 1953

G. E. FORD 2,654,253

BEZEL FOR INDICATING INSTRUMENTS

Filed June 29, 1948

GEORGE E. FORD
INVENTOR

BY Charles Shepard
ATTORNEY

Patented Oct. 6, 1953

2,654,253

UNITED STATES PATENT OFFICE 2,654,253

BEZEL FOR INDICATING INSTRUMENTS

George E. Ford, Brighton, N. Y., assignor to Qualitrol Corporation, East Rochester, N. Y., a corporation of New York Application June 29, 1948, Serial No. 35,855

3 Claims. (Cl. 73—431)

In certain kinds of indicating instruments, as for example in certain styles of liquid level gauges, it is customary to provide a mounting plate on which the operating mechanism (for example, a float and associated parts) is mounted, and a separate unit comprising a hollow case enclosing a dial and pointer, and a glass or other transparent plate closing the front of the hollow case. It is usually desirable to mount this case and transparent plate unit detachably on the front of the main mounting plate, and it is frequently desirable to be able to secure this unit detachably to the front of the mounting plate while at the same time securing the transparent plate to the case permanently in such manner that the two cannot be separated (as a practical matter) without destroying the parts. For this purpose, it has heretofore been found convenient to employ a bezel to hold the transparent plate and the case in permanent fixed position to each other, and also to hold them detachably on the mounting plate.

An object of the present invention is the provision of an improved bezel for the purpose above indicated.

The bezels heretofore employed for this purpose have usually been of cast metal. Attempts have been made to provide bezels of sheet metal, but the sheet metal bezel designs used in the past, although satisfactory for some purposes, have usually been unable to retain the transparent plate and the case in permanent relation to each other except by means of a tight press fit, where as an even more permanent type of connection (such as by swaging or staking) has been highly desirable, but unobtainable with the sheet metal bezels heretofore in use.

Accordingly, it is another object of the present invention to provide a simple and relatively inexpensive sheet metal bezel so designed and constructed that a staking operation or a swaging operation may be employed on the bezel, to unite the transparent plate and the case permanently to each other, the design of the bezel also enabling its use for detachably securing the case to the mounting plate.

Another object is the provision of a sheet metal bezel of improved appearance as compared with prior sheet metal bezels used for similar purposes.

These and other desirable objects are accomplished by the construction disclosed as an illustrative embodiment of the invention in the following description and in the accompanying drawings forming a part hereof, in which:

Fig. 1 is a longitudinal cross section taken centrally through an indicating instrument, showing the bezel of the present invention in radial cross section; and Fig. 2 is a front elevation of the indicating instrument, including the bezel.

The same reference numerals throughout the several views indicate the same parts.

Except for the design and construction of the bezel itself, the other parts of the indicating instrument may be of any suitable or known construction, and the details of the indicating instrument here illustrated for the sake of a convenient example are not to be taken in a limiting sense. The instrument is here shown as a liquid level gauge. Certain features of construction of the liquid level gauge itself (other than the bezel here disclosed) are disclosed and claimed in my copending patent applications, Serial No. 632,683, filed December 4, 1945 (now Patent 2,473,581, granted June 21, 1949, and Serial No. 730,646, (now Patent 2,514,323, granted July 4, 1950) filed February 24, 1947.

The liquid level gauge comprises a main mounting plate 11, preferably of circular outline or circumference, having openings 13 through which bolts may extend to fasten the mounting plate on the face of a tank or other receptacle, and having a gasket 15 for making a tight seal with such tank or receptacle. A tube 17, permanently fixed to the rear of the plate 11, projects rearwardly therefrom through a suitable opening in the wall of the tank or receptable, and is provided with a plurality of cups 19 which serve as bearings for the shaft 21 having a thrust bearing pin 23 at its forward end bearing against the rear face of the plate 11, and also having a permanent magnet 25 fixed to the shaft near its forward end. At its rear end, the shaft is fixed to a hub 27 which carries a radial arm 29 terminating in a float 31 which rises and falls as the liquid level in the tank changes, thus turning the shaft 21 and the magnet 25.

On the front face of the mounting plate 11 there is detachably mounted a unit comprising a hollow case 41 having a forwardly extending central pivot 43 forming a bearing for a hub 45 which carries a permanent magnet 47 and a pointer 49 which sweeps across suitable graduations on a dial plate 51 mounted in fixed position in the case 41. As the magnet 25 turns in response to variations in liquid level affecting the float 31, the magnetic action causes corresponding turning of the magnet 47 and pointer 49, which gives an appropriate indication by means of the graduations on the dial plate 51.

The case 41 is provided near its outer edge with a forwardly extending or cylindrical flange 55, then another radial flange 57, and finally another forwardly extending or cylindrical flange 59 which constitutes the front edge of the case 41. The front of the case is closed by a suitable transparent plate, such as the glass plate 61 having its periphery received in a gasket 63 of U-shaped cross section, seated snugly within the case flange 59 and on the front face of the flange 57.

The parts thus far described may, as already indicated, be varied to a considerable extent without departing from the present invention, since the present invention concerns itself with the provision of a simple and inexpensive sheet metal bezel serving the dual function of holding the case element 41 and transparent plate element 61 in permanent fixed relation to each other, and in holding both of them detachably on the front of the main mounting plate 11.

The bezel comprises a sheet metal stamping having a main outer flange 71 of generally cylindrical shape. However, only the rear portion of this flange is really cylindrical, to fit on the periphery of the mounting plate 11 as well seen in Fig. 1, being held thereto by any suitable detachable means such as the radial screws 73 extending through the bezel flange 71 and into the plate 11 at various intervals around the periphery. Forwardly of the mounting plate 11, the bezel flange 71 is, in cross section, curved somewhat inwardly as seen in Fig. 1, for the sake of a more pleasing appearance. Then at its front corner 75 it is bent inwardly more sharply, and beyond the bend is a radial flat portion 77 which, as seen, terminates at 79 where the sheet metal is doubled back or folded back sharply upon itself, to form a second layer 81 lying to the rear of and substantially parallel with and preferably substantially in contact with the rear face of the flange 77.

This flange 81 extends radially outwardly to a corner 83, where the metal is sharply bent rearwardly to provide a substantially cylindrical flange portion 85 which fits snugly around the periphery of the flange portion 59 of the case.

In assembling the parts, the glass 61 and the gasket 63 embracing its periphery are placed in the step formed by the parts 57 and 59 at the front of the case 41, and then these assembled parts are inserted into the bezel from the rear, either by hand or by a press if, as is preferably the case, the dimensions of the bezel flange 85 are such as to make a tight press fit with the case flange 59. Then when the positioning of these parts is complete, the rear edge of the bezel flange 85 (which at this time projects somewhat rearwardly beyond the plane of the case flange 57) is either staked down at intervals around its periphery, onto the corner of the case formed between the flanges 57 and 59, or, preferably, is swaged down continuously all the way around the periphery of the flange 85, the rear edge being curled over inwardly and downwardly onto the case flange 57 as seen at 87 in Fig. 1. It is seen from Fig. 1 that there is ample space between the bezel parts 85 and 71 for the insertion of a suitable tool, such as a hollow conical die, to engage the rear edge of the flange 85 and bend it over in a radially inward direction as at 87.

This unites the parts permanently to each other, in such manner that, for all practical purposes, they cannot be separated without destroying them. The flange 81 on the bezel presses tightly rearwardly against the gasket 63, creating a tight seal at this point, while the staked or swaged part 87 of the bezel serves to prevent rearward escape of the case flange 57 from the bezel. Thus not only is a tight seal (highly desirable in instruments of this kind) maintained between the glass plate and the case, but also it is insured that amateur mechanics will not take the structure apart for the purpose of allegedly repairing the dial or pointer, thus making it impossible for the manufacturer's authorized representative to fix responsibility for any defect. At the same time, although the parts 61 and 41, and all that is enclosed between them, are fixedly and permanently united to each other, there is no difficulty in removing them as a unit from the mounting plate 11, which is done easily simply by removing the accessible screws 73. So if anything goes wrong with the dial and pointer unit, it can be removed quickly from the mounting plate 11 and a new unit of the same kind can be substituted on the same mounting plate 11, without disturbing the rest of the gauge.

The advantages heretofore attainable only with a relatively expensive and heavy cast metal bezel, are now attainable with a light and inexpensive sheet metal bezel constructed in accordance with this invention.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. An indicating instrument comprising a mounting plate having a general plane and having a peripheral surface approximately perpendicular to said general plane, a transparent plate located forwardly of and approximately parallel to the general plane of said mounting plate, a bezel of sheet material formed to provide a main outer flange embracing said peripheral surface of said mounting plate and extending forwardly therefrom, said sheet material being bent inwardly at the front of said main outer flange to provide a front face flange overlying and spaced forwardly from the marginal portion of said transparent plate and being folded sharply upon itself at the inner edge of said front flange and extending thence outwardly in a second layer lying between and approximately parallel to said front face flange and said transparent plate, said sheet material being further bent rearwardly at the outer edge of said second layer to provide a marginal flange surrounding the periphery of said transparent plate, and an instrument case of sheet material separate from said mounting plate and having a rear wall lying in front of said mounting plate and a forwardly projecting annular marginal flange embracing the outer edge of said transparent plate and engaged tightly within said marginal flange of said bezel.

2. A construction as claimed in claim 1, in which the rear edge of said marginal flange of said bezel is swaged inwardly over said annular marginal flange of said instrument case.

3. A sheet metal bezel ring for indicating instruments that embody a substantially disk shaped mounting plate, which ring includes a relatively deep cylindrical outer flange, the rearward portion of which is adapted to fit over such mounting plate, a front flange proceeding therefrom diametrically inwardly and thence, doubled upon itself, diametrically outwardly to provide a relatively restricted view opening and a rearwardly open seat, said outwardly turned portion thence, within the said outer flange, proceeding at right angles rearwardly and terminating finally in a slightly diametrically inwardly turned lip of greater inner diameter than that of the said front flange and the view opening to provide for the reception and retention of a generally disk shaped element inserted from the rear to occupy the seat furnished by the front flange, in combination with a generally disk shaped element distinct and separate from the mounting plate and of greater diameter than the view opening which element is provided with and supports a rearward instrument dial and a forward transparent viewing plate and closure collectively permanently held against the front flange seat by the lip.

GEORGE E. FORD.

References Cited in the file of this patent

UNITED STATES PATENTS

| Number | Name | Date |
|---|---|---|
| 68,681 | Ames | Sept. 10, 1867 |
| 522,551 | Bosworth | July 3, 1894 |
| 2,311,387 | Hastings | Feb. 16, 1943 |
| 2,384,928 | Kahn | Sept. 18, 1945 |
| 2,473,581 | Ford | June 21, 1949 |

FOREIGN PATENTS

| Number | Country | Date |
|---|---|---|
| 235,198 | Great Britain | Aug. 20, 1925 |